United States Patent
Zhao et al.

(10) Patent No.: US 8,248,962 B2
(45) Date of Patent: Aug. 21, 2012

(54) LONG TERM EVOLUTION USER EQUIPMENT MULTI-PACKET DATA NETWORK PARAMETER BASED CONNECTIVITY CONTROL

(75) Inventors: Xiaoming Zhao, Plano, TX (US); James Earl Womack, Bedford, TX (US); Zhijun Cai, Euless, TX (US); Wei Wu, Coppell, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 702 days.

(21) Appl. No.: 12/263,274

(22) Filed: Oct. 31, 2008

(65) Prior Publication Data

US 2009/0116440 A1 May 7, 2009

Related U.S. Application Data

(60) Provisional application No. 60/985,084, filed on Nov. 2, 2007.

(51) Int. Cl.
*H04J 1/16* (2006.01)
*H04L 12/28* (2006.01)
(52) U.S. Cl. .................. 370/252; 370/328; 370/401
(58) Field of Classification Search .................. None
See application file for complete search history.

(56) References Cited

U.S. PATENT DOCUMENTS

| | | | |
|---|---|---|---|
| 2006/0148483 A1* | 7/2006 | Howard et al. | 455/450 |
| 2009/0086705 A1* | 4/2009 | Zisimopoulos et al. | 370/347 |
| 2009/0116404 A1* | 5/2009 | Mahop et al. | 370/254 |
| 2009/0303924 A1* | 12/2009 | Patil et al. | 370/328 |
| 2010/0208698 A1* | 8/2010 | Lu et al. | 370/331 |

OTHER PUBLICATIONS

3GPP TR 25.813 V7.1.0; Technical Specification Group Radio Access Network; Evolved Universal Terrestrial Radio Access (E-UTRA) and Evolved Universal Terrestrial Radio Access Network (E-UTRAN); Radio interface protocol aspects; Release 7; Sep. 2006; 41 pgs.

3GPP TR 25.814 V7.1.0; Technical Specification Group Radio Access Network; Physical layer aspects for evolved Universal Terrestrial Radio Access (UTRA); Release 7; Sep. 2006; 132 pgs.

3GPP TS 36.300 V8.1.0; Technical Specification Group Radio Access Network; Evolved Universal Terrestrial Radio Access (E-UTRA) and Evolved Universal Terrestrial Radio Access Network (E-UTRAN); Overall description; Stage 2; Release 8; Jun. 2007; 106 pgs.

(Continued)

*Primary Examiner* — Andrew Lee
(74) *Attorney, Agent, or Firm* — Conley Rose, P.C.; J. Robert Brown, Jr.

(57) ABSTRACT

A system is provided for concurrently connecting a user equipment to a plurality of packet data network gateways via a radio access network and a serving gateway. The system includes a processor configured to evaluate an operational parameter related to a set of network components to which the user equipment, the radio network, the serving gateway and the packet data network gateways belong. The operational parameter is used to control a user equipment to multiple packet data networks, subject to resource limitation, and QoS and PCC rules.

14 Claims, 5 Drawing Sheets

OTHER PUBLICATIONS

3GPP TS 23.401 V1.2.1; 3rd Generation Partnership Project; Technical Specification Group Services and System Aspects; GPRS enhancements for E-UTRAN access; Release 8; Sep. 2007; 87 pgs.

3GPP TSG-SA WG2 #31; Definition and Use of Long-Lived PDP Context; Tdoc S2-031344; Seoul, South Korea; Apr. 7-11, 2003; 5 pgs.

PCT International Search Report; PCT Application No. PCT/US2008/082109; Mar. 20, 2009; 3 pgs.

PCT Written Opinion of the International Searching Authority; PCT Application No. PCT/US2008/082109; Mar. 20, 2009; 8 pgs.

European Examination Report; EP Application No. 08845536.5; Oct. 6, 2010; 5 pgs.

Second European Examination Report; Application No. 08845536.5; May 18, 2011; 4 pages.

3GPP TSG SA2 Meeting #9; "Multicall for PS"; Document No. S2-99B30; London, UK; Oct. 25-29, 1999; 16 pages.

* cited by examiner

LONG TERM EVOLUTION USER EQUIPMENT MULTI-PACKET DATA NETWORK PARAMETER BASED CONNECTIVITY CONTROL

CROSS-REFERENCE TO RELATED APPLICATIONS

The present application claims priority to U.S. Provisional Patent Application No. 60/985,084, filed Nov. 2, 2007, by Xiaoming Zhao, et al, entitled "Long Term Evolution User Equipment Multi-Packet Data Network Connectivity Control", which is incorporated by reference herein as if reproduced in its entirety.

BACKGROUND

Easily transportable devices with wireless telecommunications capabilities, such as mobile telephones, personal digital assistants, handheld computers, and similar devices, will be referred to herein as user equipment (UE). The term "UE" may refer to a device and its associated Universal Integrated Circuit Card (UICC) that includes a Subscriber Identity Module (SIM) application, a Universal Subscriber Identity Module (USIM) application, or a Removable User Identity Module (R-UIM) application or may refer to the device itself without such a card. A connection between a UE and some other element in a telecommunications network might promote a voice call, a file transfer, or some other type of data exchange, any of which can be referred to as a call or a session.

Some UEs communicate in a circuit switched mode, wherein a dedicated communication path exists between two devices. For the duration of a call or session, all data exchanged between the two devices travels along the single path. Some UEs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers.

Communications that take place via circuit switching can be said to occur in the circuit switched domain and communications that take place via packet switching can be said to occur in the packet switched domain. Within each domain, several different types of networks, protocols, or technologies can be used. In some cases, the same network, protocol, or technology can be used in both domains. The wireless communication networks may be based on Code Division Multiple Access (CDMA), Time Division Multiple Access (TDMA), Frequency Division Multiple Access (FDMA), Orthogonal Frequency Division Multiplexing (OFDM), or some other multiple access scheme. A CDMA-based network may implement one or more standards such as 3GPP2 IS-2000 (commonly referred to as CDMA 1x), 3GPP2 IS-856 (commonly referred to as CDMA 1xEV-DO), or 3GPP UMTS (Universal Mobile Telecommunications System). The modes of access for UMTS are referred to as Universal Terrestrial Radio Access (UTRA). Such access networks are referred to as UTRAN. Enhanced UTRAN are referred to as e-UTRAN. A TDMA-based network may implement one or more standards such as 3GPP Global System for Mobile Communications (GSM) or 3GPP General Packet Radio Service (GPRS).

GSM is an example of a wireless network standard that uses only the circuit switching mode. Examples of wireless network standards that use only packet switching include GPRS, CDMA 1x EV-DO, Worldwide Interoperability for Microwave Access (WiMax), and Wireless Local Area Network (WLAN), which might comply with Institute of Electrical and Electronics Engineers (IEEE) standards such as 802.16, 802.16e, 802.11a, 802.11b, 802.11g, 802.11n, and similar standards. Examples of wireless network standards that may use both circuit switching and packet switching modes include CDMA 1x and UMTS. The IP (Internet Protocol) Multimedia Subsystem (IMS) is a packet switched technology that allows multimedia content to be transmitted between UEs.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment. For LTE equipment, the region in which a wireless device can gain access to a telecommunications network might be referred to by a name other than "cell", such as "hot spot". As used herein, the term "cell" will be used to refer to any region in which a wireless device can gain access to a telecommunications network, regardless of whether the wireless device is a traditional cellular device, an LTE device, or some other device.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to one embodiment, a system is provided for concurrently connecting a plurality of packet data networks through a serving gateway and use of separate packet data gateways or a single PDN gateway. The system includes a processor configured to evaluate an operational parameter related to a set of network components to which the serving gateway and the packet data network gateways belong. The operational parameter limits a quantity of packet data network gateways to which the UE concurrently connects.

In another embodiment, a method is provided for concurrently connecting a plurality of packet data networks through a serving gateway and use of separate packet data gateways or a single PDN gateway t. The method includes specifying an operational parameter of a system of which the serving gateway and the packet data network gateways are components. The operational parameter limits a quantity of packet data network gateways to which the UE concurrently connects.

Figure 1:
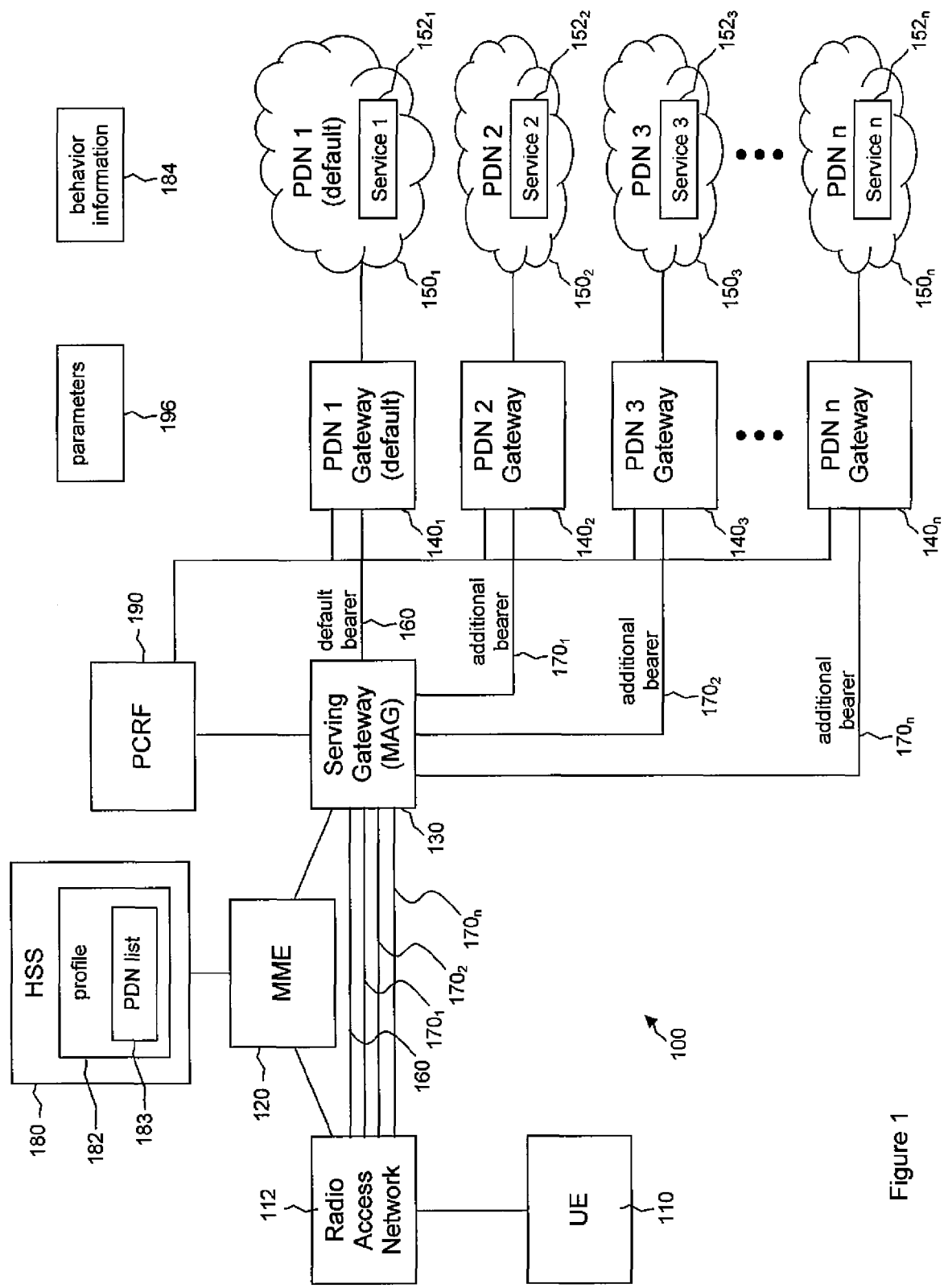
FIG. 1 is an illustration of a wireless telecommunications system according to an embodiment of the disclosure.

FIG. 1 illustrates an exemplary wireless telecommunications system 100 according to an embodiment of the disclosure. The system 100 includes a UE 110 that can connect to a plurality of packet data networks (PDNs) 150. The PDNs 150 might be Internet-based networks or might be other types of networks that can provide packet-based data. Each PDN 150 can allow access to packet-based services 152, such as World Wide Web pages, multimedia broadcast/multicast services, and other data packet-based services. To access the PDNs 150, the UE 110 might first exchange one or more messages with a mobility management entity (MME) 120. The MME 120 establishes a bearer between the UE 110 and other components in the system 100.

The UE 110 may connect to the radio access network (RAN) 112 via the air interface. The RAN 112 may have direct bearer connections to a serving gateway 130, which can also be referred to as a mobile access gateway (MAG). The serving gateway 130 terminates the interface of the radio access portions of the system 100 and forwards packets to the PDNs 150 via a plurality of PDN gateways 140 or a single PDN gateway. Each PDN gateway 140 can allow access to one or more PDNs 150. While each PDN gateway 140 is shown providing access to only one PDN 150, each PDN gateway 140 might provide access to a plurality of PDNs 150.

Traditionally, at the user equipment attachment to the network, the MME 120 may establish a bearer for the user equipment from the radio access network to the core network access between the radio access network 112 and one PDN among the plurality of PDNs 150 that is considered the default PDN. This initial bearer connection through the serving gateway 130 is known as the default bearer, and the gateway through which the connection is made is known as the default gateway. In FIG. 1, PDN $150_1$ is the default PDN, gateway $140_1$ is the default gateway, and the serving gateway 130 connects to the default gateway $140_1$ through a default bearer 160.

Based on the UE's subscription profile, beside the default PDN, the UEs 110 are allowed concurrently to connect to other PDNs 150 via the serving gateway 130 and other PDN gateways 140. Each connection between the UE and a PDN has a default bearer and it may have additional bearers besides the default bearer. Also based on the quality of service (QoS) profile, a bearer might conform to a set (or subset) of quality of service requirements, such as a guaranteed bit rate (GBR), a maximum bit rate (MBR), a packet delay budget (PDB), and other parameters of data transfer quality. In FIG. 1, different bearers 170 connect between the e-UTRAN 112 and the serving gateway 130 and to each of the plurality of PDN gateways 140, other than the default PDN gateway $140_1$.

It should be noted that some of the lines connecting the components in FIG. 1 represent bearer connections and some of the lines represent signaling connections. Traditionally, different styles of lines are used to represent the different types of connections. However, for the sake of clarity in the drawing, the different types of connections in FIG. 1 are represented by the same style of line.

Concurrent connections between the UE 110 and multiple PDNs 150 could provide the UE 110 with fast access to multiple PDNs 150. For example, the UE 110 might use the bearer 160 to the default PDN $150_1$ in order to access the World Wide Web and use a second PDN $150_2$ in order to access a video download. If concurrent bearers exist to both PDN gateway $140_1$ and PDN gateway $140_2$ the user could quickly switch between accessing PDN $150_1$ and PDN $150_2$. If concurrent bearers were not possible and the user wished to switch from PDN $150_1$ to PDN $150_2$, a new bearer would be established at the time access to PDN $150_2$ was attempted.

For such UEs 110, it might be desirable to establish one or more additional bearer connections 170 to additional PDNs after the default bearer 160 to the default PDN gateway (or the default PDN) is established. In this way, the additional bearers 170 will be ready for use if the user should decide to switch to a different PDN 150 after connecting to the default PDN $150_1$. A list might be configured (or created) in the system or on the UE specifying which of the PDNs 150 is the default PDN $150_1$ and which additional PDNs 150 should be connected when the connection to the default PDN $150_1$ is established. When the UE 110 wishes to make a network connection, this PDN list can be consulted and connections can be made to the default PDN $150_1$ and to the additional PDNs 150 on the PDN list without the user's involvement.

A home subscriber server (HSS) 180, or a similar component, can connect to the MME 120 and can store data related to a profile 182 for the UE 110. A PDN list 183 that specifies the PDNs 150 to which the UE 110 subscribed to allow concurrent connection might be among the items stored in the profile 182. The profile 182 may be stored in a database or in a similar data storage component. Also, the profile 182 may be stored in and retrieved from a component of the system 100 other than the HSS 180. The PDN list 183 may be also stored in the data store on the UE 110.

A policy control and charging rules function (PCRF) 190, or a similar component, can connect to the serving gateway 130 and the PDN gateways 140 and can store policies related to the connections between the serving gateway 130 and the PDN gateways 140 on behalf of the UE.

In an embodiment, connection of an LTE UE to multiple PDNs 150 is supported as stated in 3GPP Technical Specification 23.401. Upon the UE's initial attachment to the network, in addition to connecting to the default PDN $150_1$, based on the UE's initiation, additional PDN bearer connectivity might be established between the UE 110, via serving gateway 130, and the other PDN gateways 140 specified in the PDN list 183 in the profile 182. Based on the UE's quality of service requirements, multiple PDN connectivity may entail additional bearers 170 with specified guaranteed bit rates. Since the bandwidths for the PDN gateways 140 might be limited, if the majority of the UEs 110 have multiple PDN connectivity support and also require guaranteed bit rates, the network PDN bearer connection reservation could exceed the bandwidth limits in some cases. In particular, if not all the multiple connectivity guaranteed bit rate bearers are activated for use for a relatively long time, network bandwidth resources could be wasted and bearer usage starvation could result.

In other words, it might have more connections than is necessary to be made between the e-UTRAN 112 and the PDN gateways 140 for the UE. For example, a user of the UE 110 might typically use only two of the PDNs 150 at any one time and therefore may need to connect only to the PDN gateways 140 associated with those two PDNs 150. However, per UE configuration it might initiate bearers to be established to more PDN gateways 140 than the two that are typically used.

Several undesirable results can occur when more bearers to the PDN gateways 140 are made than may be necessary. For example, concurrent connections to more PDN gateways 140 than necessary can cause the use of more bandwidth, filters, traffic flow templates, and other network resources than necessary. Also, unnecessary connections having no data transferred for an extended time can waste network resources. In addition, service data flow burst conditions can result from unnecessary connections between the serving gateway 130 and the PDN gateways 140. This could occur in the case where many UEs 110 may have non-guaranteed bit rate accesses available to the same PDN gateway and all of the UEs 110 start their data traffic at substantially the same time. Also, excessive bearers between the serving gateway 130 and the PDN gateways 140 can lead to load balancing and scaling issues.

In various embodiments, measures are implemented to control the number of concurrent connections between the e-UTRAN 112 and the PDN gateways 140 for the UEs 110. In an embodiment, operational parameters 196 of the system 100 are used to control connectivity to the PDN gateways 140. Bearer establishment rules based on the values of the parameters 196 together with the QoS parameters could put the connections between the UEs 110 and the PDN gateways 140 well under control to prevent the potential issues stated above.

One parameter 196 might relate to the number of PDNs 150 to which UE 110 can connect at any one time. When the maximum number of PDNs 150 to which the UE 110 is allowed to connect is reached, connections to additional PDN gateways 140 (or additional PDNs 150) might be prevented. That is, the establishment of additional bearers 170 might not be allowed.

Another parameter 196 might relate to the number of non-default PDN bearers to which one PDN 150 can connect at any one time via a PDN gateway 140. Once a maximum number of non-default PDN bearers is reached, bearer connections between the serving gateway 130 and the PDN gateway 140 for additional non-default PDNs 150 might be prevented. The corresponding bearer connection between the e-UTRAN 112 and the serving gateway 130 might be also prevented.

Yet another parameter 196 might relate to the length of time the connection to one of the PDNs 150 is idle. If no activity is measured to an established bearer between the UE and one of the non-default PDNs 150 for a specified length of time, the bearer connection to that PDN 150 could be considered idle. Subject to the QoS (quality of service) or PCC (Policy and Charge Control) rules in which this bearer connection is allowed to be removed, then this bearer could be removed.

Still another parameter 196 might relate to the resources in use in the system 100. When the resources being used reach a threshold, additional connections between the UEs 110 and the PDN gateways 140 might be handled following the PCC rules that provide for removing some of the lower priority bearers to save the capacity and to allow establishment of higher priority service bearer requests. Alternatively when the resources being used reach a threshold, additional connections between the UEs 110 and the PDN gateways 140 might be prevented. Resource use might be measured in terms of data throughput or similar parameters related to the quantity of network activity. Resource use measurement might be applied to any components of the system 100 individually or to any combination of the components.

Figure 2:
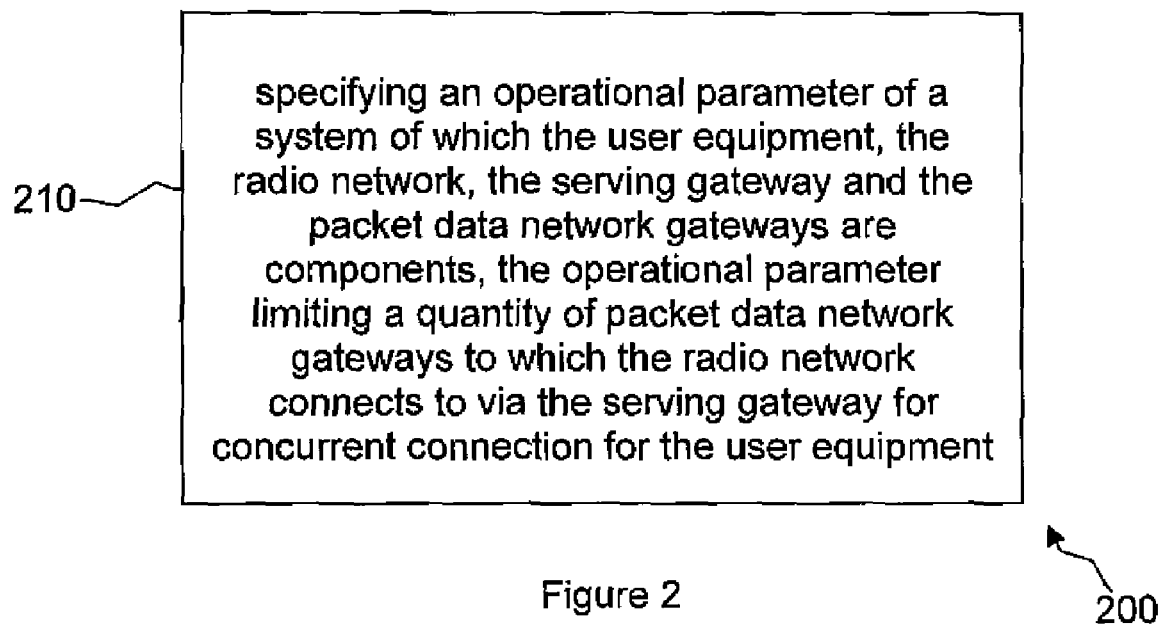
FIG. 2 is a diagram of a method for controlling user equipment connectivity to packet data networks according to an embodiment of the disclosure.

FIG. 2 illustrates an embodiment of a method 200 for concurrently connecting a plurality of packet data network gateways to a UE via an e-UTRAN and a serving gateway. At a block 210, an operational parameter of a system of which the UE, the e-UTRAN, the serving gateway and the packet data network gateways are components is specified. The value of the operating parameter limits the quantity of components to which the UE can concurrently connect.

In another embodiment, the PDN list 183 in the profile 182 specifies the PDNs 150 to which the UE 110 is authorized to allow concurrent connectivity. A subset of the PDN list 183 can be configured for UE initiated additional PDN connections. This subset can be referred to as the active multiple PDN connectivity group and it can be set and modified by the UE. At UE attachment to the network, after the bearer connection establishment between the UE and its default PDN, the UE might initiate the additional PDN connectivity following this active multiple PDN connectivity group.

A flag or similar indicator can be associated with each of the PDNs 150 in the PDN list 183. Turning on the flag or otherwise activating the indicator can designate one of the PDNs 150 on the PDN list 183 as a member of the active multiple PDN connectivity group. When the flag is turned off or the indicator is otherwise deactivated for one of the PDNs 150 on the PDN list 183, that PDN 150 is not a member of the active multiple PDN connectivity group.

The user of the UE 110 can provide input to the UE 110 to manually designate which of the PDNs 150 should be placed in the active multiple PDN connectivity group and should thereby be automatically initiated by the UE for additional PDN connections upon the UE attachment to the network. The user's designation might be stored as a flag on one of the PDNs 150 in the PDN list 183 in the profile 182 and might be implemented when the default bearer 160 is established. Alternatively, the user could be prompted to make such a designation when the user makes an attempt to connect to the default PDN 1501. In addition, the UE user might be allowed to add PDNs 150 to the PDN list 183 in the profile 182.

Connections to additional PDNs 150 might be allowed through a manual request after the default bearer 160 is established.

In an embodiment, removal of one of the PDNs 150 from the active multiple PDN connectivity group can be done in a manner analogous to the placement of one of the PDNs 150 in the active multiple PDN connectivity group. That is, a UE user might remove one of the PDNs 150 from the active multiple PDN connectivity group by manually turning off a flag or otherwise deactivating the indicator associated with one of the PDNs 150 in the PDN list 183.

In some embodiments, the operational parameters 196 and the active multiple PDN connectivity group in the profile 182 may be used in combination for connectivity control. For example, the initial connectivity decisions might be made based on the active multiple PDN connectivity group and then the operational parameters 196 might be used to determine whether to make additional connections and/or whether to maintain existing connections. Other combinations of profiles and operational parameters 196 for connectivity control will readily suggest themselves to one skilled in the art based on the present disclosure.

Figure 3:
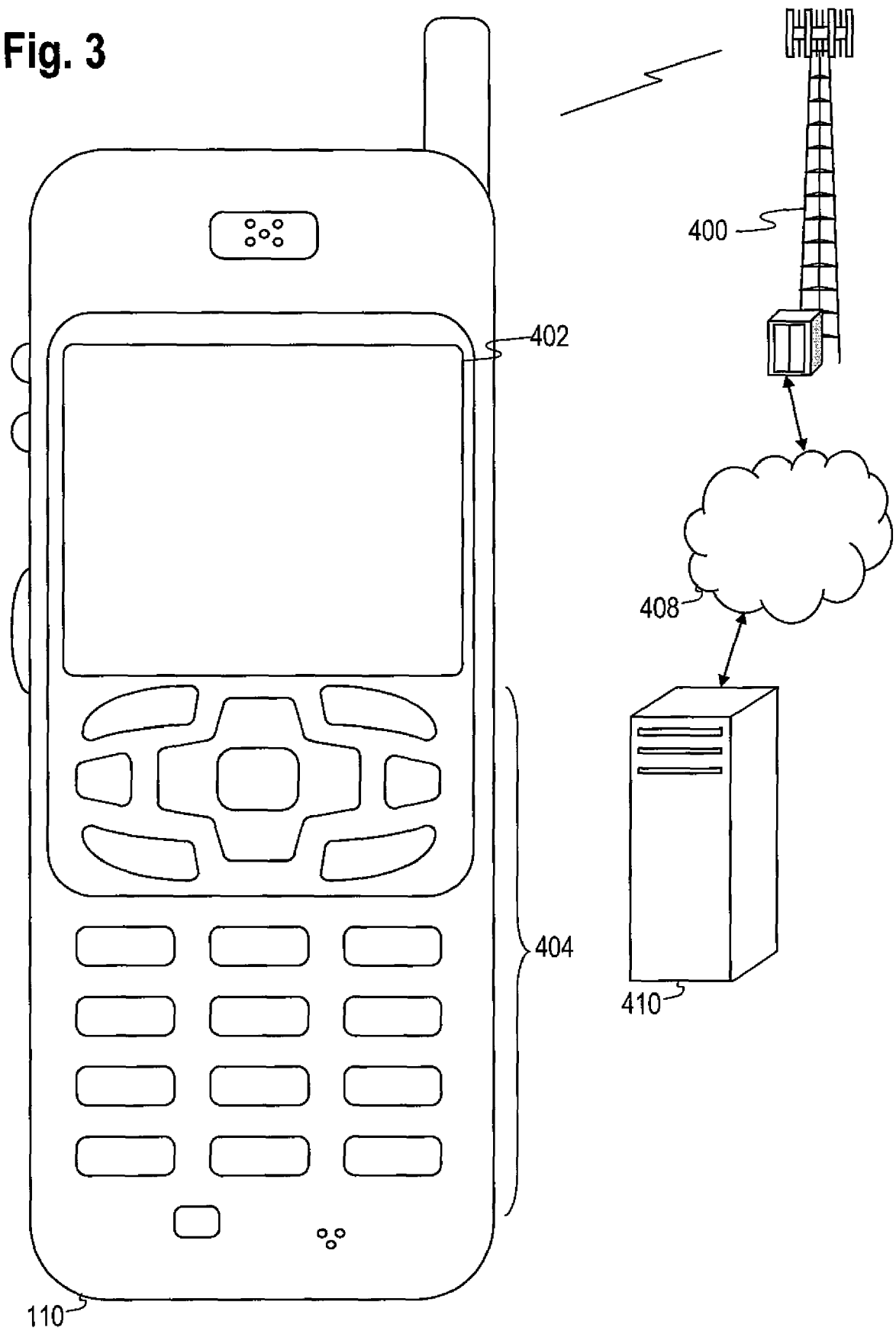
FIG. 3 is a diagram of a wireless communications system including user equipment operable for some of the various embodiments of the disclosure.

FIG. 3 illustrates a wireless communications system including an embodiment of the UE 110. The UE 110 is operable for implementing aspects of the disclosure, but the disclosure should not be limited to these implementations. Though illustrated as a mobile phone, the UE 110 may take various forms including a wireless handset, a pager, a personal digital assistant (PDA), a portable computer, a tablet computer, or a laptop computer. Many suitable devices combine some or all of these functions. In some embodiments of the disclosure, the UE 110 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 110 may be a portable, laptop or other computing device. The UE 110 may support specialized activities such as gaming, inventory control, job control, and/or task management functions, and so on.

The UE 110 includes a display 402. The UE 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 110 may present options for the user to select, controls for the user to actuate, and/or cursors or other indicators for the user to direct.

The UE 110 may further accept data entry from the user, including numbers to dial or various parameter values for configuring the operation of the UE 110. The UE 110 may further execute one or more software or firmware applications in response to user commands. These applications may configure the UE 110 to perform various customized functions in response to user interaction. Additionally, the UE 110 may be programmed and/or configured over-the-air, for example from a wireless base station, a wireless access point, or a peer UE 110.

Among the various applications executable by the UE 110 are a web browser, which enables the display 402 to show a web page. The web page may be obtained via wireless communications with a wireless network access node, a cell tower, a peer UE 110, or any other wireless communication network or system 400. The network 400 is coupled to a wired network 408, such as the Internet. Via the wireless link and the wired network, the UE 110 has access to information on various servers, such as a server 410. The server 410 may provide content that may be shown on the display 402. Alternately, the UE 110 may access the network 400 through a peer UE 110 acting as an intermediary, in a relay type or hop type of connection.

Figure 4:
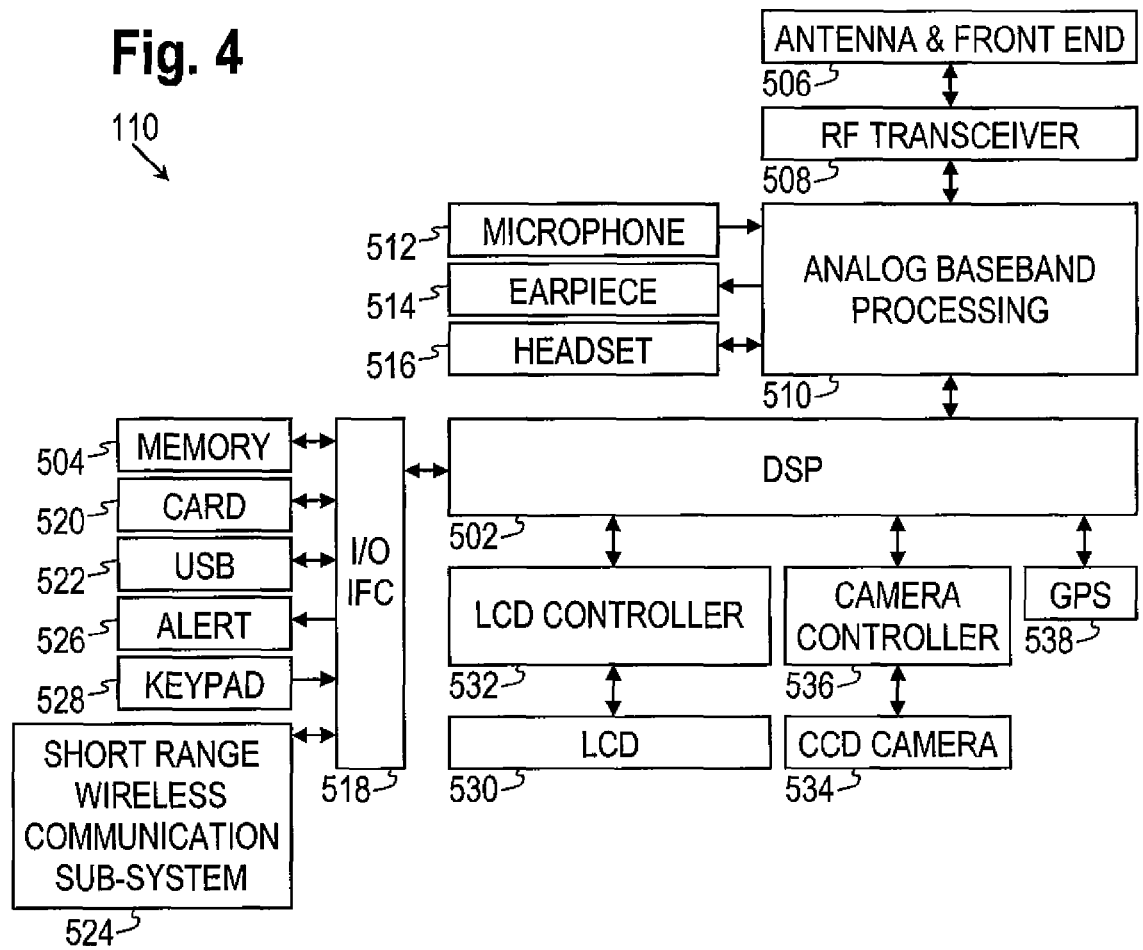
FIG. 4 is a block diagram of user equipment operable for some of the various embodiments of the disclosure.

FIG. 4 shows a block diagram of the UE 110. While a variety of known components of UEs 110 are depicted, in an embodiment a subset of the listed components and/or additional components not listed may be included in the UE 110. The UE 110 includes a digital signal processor (DSP) 502 and a memory 504. As shown, the UE 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 110 to send and receive information from a cellular network or some other available wireless communications network or from a peer UE 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 110 and may also enable the UE 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 110 to communicate wirelessly with other nearby mobile devices and/or wireless base stations.

The input/output interface 518 may further connect the DSP 502 to the alert 526 that, when triggered, causes the UE 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 110 to determine its position. Various other peripherals may also be included to provide additional functions, e.g., radio and television reception.

Figure 5:
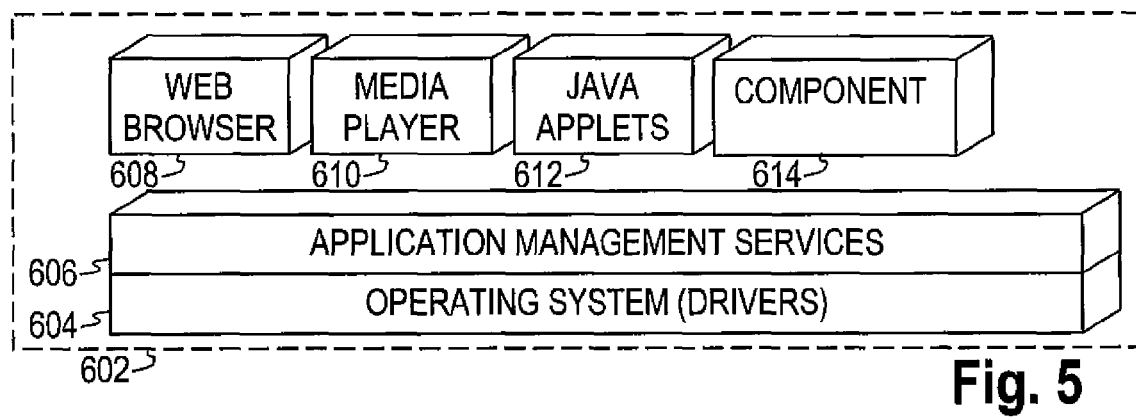
FIG. 5 is a diagram of a software environment that may be implemented on user equipment operable for some of the various embodiments of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the UE hardware with standardized interfaces that are accessible to application software. The operating system drivers 604 include application management services ("AMS") 606 that transfer control between applications running on the UE 110. Also shown in FIG. 5 are a web browser application 608, a media player application 610, and Java applets 612. The web browser application 608 configures the UE 110 to operate as a web browser, allowing a user to enter information into forms and select links to retrieve and view web pages. The media player application 610 configures the UE 110 to retrieve and play audio or audiovisual media. The Java applets 612 configure the UE 110 to provide games, utilities, and other functionality. A component 614 might provide functionality related to connectivity control.

Figure 6:
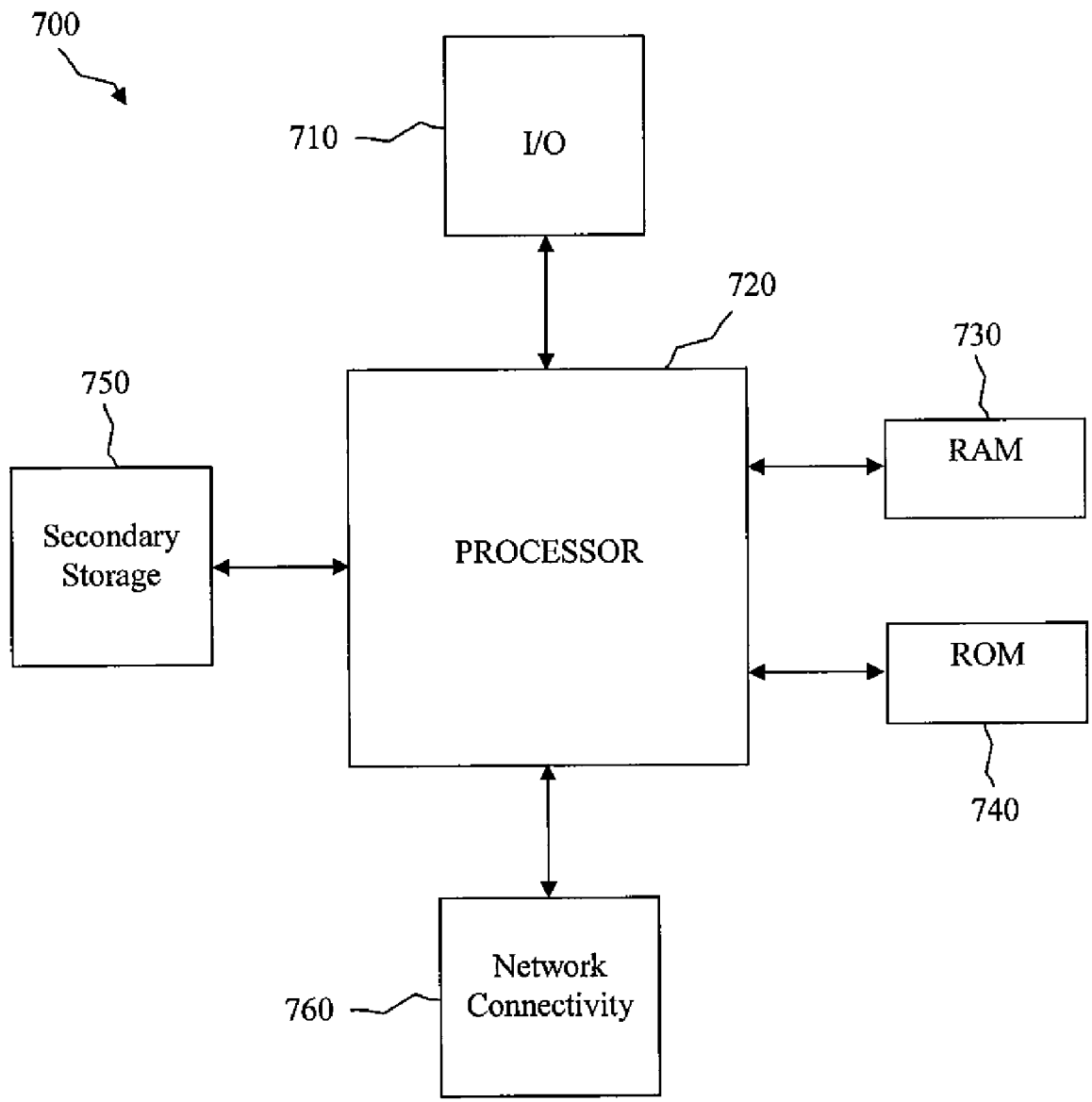
FIG. 6 is an illustrative general purpose computer system suitable for some of the various embodiments of the disclosure.

The UE 110 and other components of FIG. 1 may include any general-purpose computer with sufficient processing power, memory resources, and network throughput capability to handle the necessary workload placed upon it. FIG. 6 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk-based systems may all be considered secondary storage 750), ROM 740, RAM 730, or the network connectivity devices 760. While only one processor 720 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A network node that manages packet data network (PDN) connections between a user equipment and at least one PDN via a radio access network, the network node comprising:
   a processor configured to:
      evaluate an operational parameter related to PDN connectivity; and
      limit a quantity of concurrent PDN connections between the user equipment and the at least one PDN based on the operational parameter.

2. The network node of claim 1, wherein the operational parameter is a number of packet data networks to which a user equipment can concurrently connect via the packet data network gateways, and wherein when the number reaches a threshold, a connection between the user equipment and an additional packet data network is not allowed.

3. The network node of claim 1, wherein the operational parameter is a number of non-default packet data network bearer connections to which one of the packet data network gateways can concurrently connect for a packet data network, and wherein when the number reaches a threshold, a connection request between a user equipment and the one of the packet data network gateways for the non-default packet data network is not allowed.

4. The network node of claim 1, wherein the operational parameter is a resource usage by one or more of a set of components, and wherein when resource usage reaches a threshold, a connection request between the user equipment and an additional packet data network gateway shall follow the Quality of Service (QoS) and Policy and Charge Control (PCC) rules wherein when either one of a requested bearer is accepted and active bearers having lower priority are removed to free up capacity or responsive to a resource usage reaching a threshold, a bearer connection request between the user equipment and an additional packet data network gateway is not allowed.

5. The network node of claim 1, wherein the operational parameter is a length of time during which no data is transferred between one of the packet data network gateways and a user equipment, and wherein, when the length of time reaches a threshold, a connection between one of the packet data network gateways and the user equipment is disconnected subject to Quality of Service (QoS) and Policy and Charge Control (PCC) rules.

6. The network node of claim 1, further comprising one or more data stores configured to store the operational parameter for use in user equipment to multiple PDN connectivity control.

7. A method for managing packet data network (PDN) connections between a user equipment and at least one PDN via a radio access network, the method comprising:
   evaluating an operational parameter related to network connectivity; and
   limiting a quantity of concurrent PDN connections between the user equipment and the at least one PDN based on the operational parameter.

8. The method of claim 7, wherein an additional PDN connection between the user equipment and the at least one PDN is not allowed when the quantity of concurrent PDN connections between the user equipment and the at least one PDN reaches the operational parameter, the operational parameter being a maximum number of concurrent PDN connections allowed between the user equipment and the at least one PDN.

9. The method of claim 7, wherein the operational parameter is a number of non-default packet data network bearer connections to which one of the packet data network gateways can concurrently connect, and wherein when the number reaches a threshold, a connection request between a user equipment and the one of the packet data network gateways for the non-default packet data network is not allowed.

10. The method of claim 7, wherein the operational parameter is a resource usage by one or more of a set of components, and wherein when resource usage reaches a threshold, a connection request between the user equipment and an additional packet data network gateway is according to Quality of Service (QoS) and Policy and Charge Control (PCC) rules wherein when either one of a requested bearer is accepted and active bearers having lower priority are removed to free up capacity or responsive to a resource usage reaching a threshold, a bearer connection request between the user equipment and an additional packet data network gateway is not allowed.

11. The method of claim 7, wherein the operational parameter is a length of time during which no data is transferred between one of the packet data network gateways and a user equipment, and wherein, when the length of time reaches a threshold, a connection between one of the packet data network gateways and the user equipment is disconnected subject to Quality of Service (QoS) and Policy and Charge Control (PCC) rules.

12. The method of claim 7, further comprising one or more data stores configured to store the operational parameter for use in user equipment to multiple PDN connectivity control.

13. The network node of claim 1, wherein the radio access network is at least one of a Code Division Multiple Access (CDMA) 1x EV-DO radio access network, a Worldwide Interoperability for Microwave Access (WiMax) radio access network, or a Wireless Local Area Network (WLAN) radio access network.

14. The method of claim 7, wherein the radio access network is at least one of a Code Division Multiple Access (CDMA) 1x EV-DO radio access network, a Worldwide Interoperability for Microwave Access (WiMax) radio access network, or a Wireless Local Area Network (WLAN) radio access network.

* * * * *